A. Pierpont.
Making Ferrules.
Nº 14,573. Patented Apr. 1, 1856.

UNITED STATES PATENT OFFICE.

ASAHEL PIERPONT, OF NEW HAVEN, CONNECTICUT.

IMPROVEMENT IN SOLDERING WIRE FERRULES.

Specification forming part of Letters Patent No. 14,573, dated April 1, 1856.

*To all whom it may concern:*

Be it known that I, ASAHEL PIERPONT, of the city and county of New Haven, in the State of Connecticut, have invented a new and useful Improvement in Machinery for Soldering Wire Ferrules; and I do hereby declare that the following is a full, clear, and exact description of the construction, character, and operation of the same, reference being had to the accompanying drawings, which make a part of this specification, in which—

Figure 1:
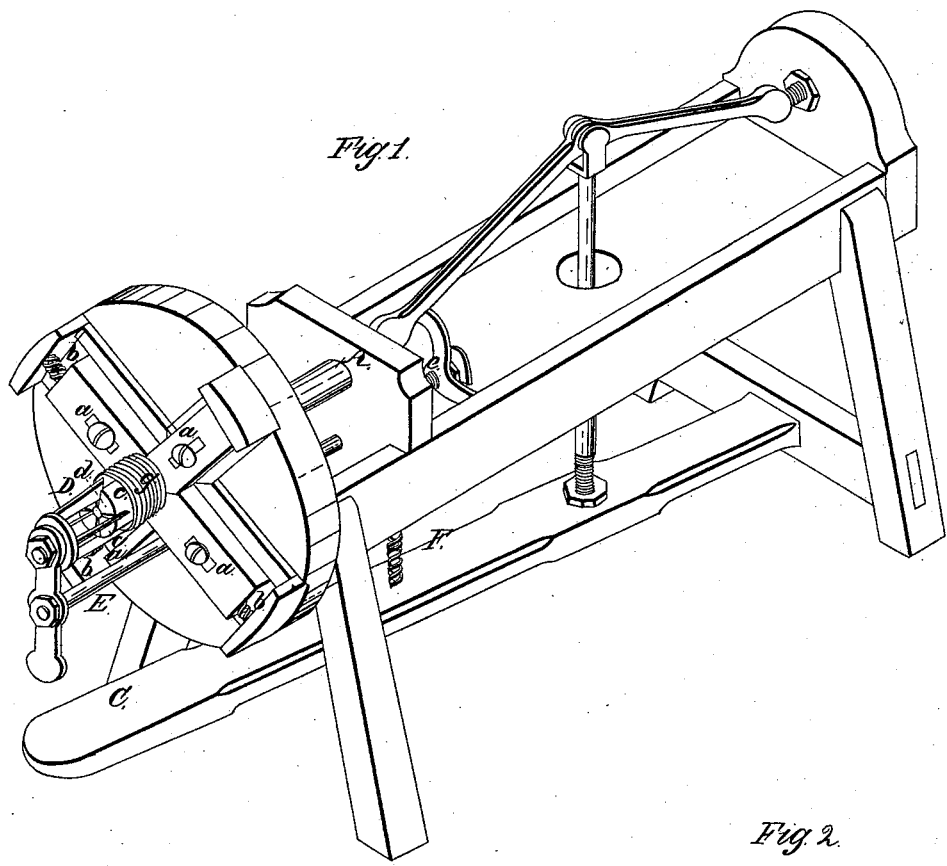
Figure 2:
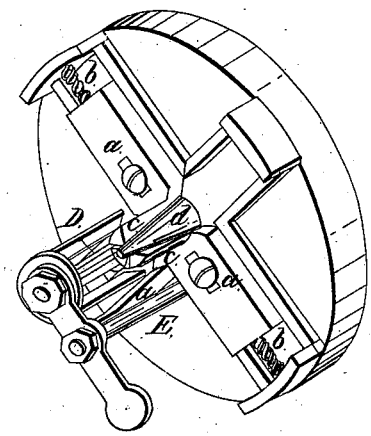
Figure 3:
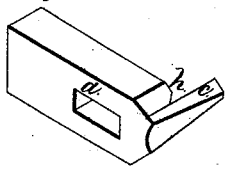

Figure 1 is a perspective view of the whole machine, with a ferrule on the jaws, in the proper way of finishing. Fig. 2 is a perspective view of the front end of the machine, showing the parts which are used to hold the ferrules while the solder is setting. Fig. 3 is a perspective view of one of the jaws onto which the ferrule is placed to hold all the parts in the exact position as the ferrule should be.

My improvement consists in constructing the machine with four (or any other convenient number of) jaws to hold the coils of the ferrule in such a manner that they will be held or pressed together by springs (or otherwise) so as to admit of the ferrule being easily passed onto them, and then forcing the jaws outward, so as to bring the ferrule to the true and exact shape desired, by means of a conical or wedge-shaped form or rod, which is worked longitudinally back and forth by a suitable lever or other suitable device; and in having an inclined circular recess in the jaw-holders to admit the inner end of the ferrule and press the inner coil firmly against the convex surface of the jaws, and a forked form to pass partially between the jaws, with the inclined ends of its prongs passing over and pressing against the outer coil, so as to hold it firmly against the convex surface of the jaws, and also to press the several coils firmly against each other, so that when the solder is set or cooled the ferrule will be in perfect shape, (which has never been accomplished by any means heretofore used for soldering ferrules of more than an inch in diameter, while with my machine they may be soldered for the largest painters' brushes, two inches or more in diameter.)

I make all the parts of the machine of cast-iron, or any other suitable material, substantially in the form represented in Fig. 1.

I make the jaws for holding the ferrules (four or any other convenient number) substantially in the form shown in Fig. 3, (and of a size suited to the different sizes of ferrules,) and attach them to the front of the frame of the machine, as shown at *a a a a*, by screws passing through slots, and press them together by springs, as shown at *b b*, Figs. 1 and 2, or other suitable means. The parts *c c* of the jaws are pressed against the conical form *d*, as represented in Fig. 2, (where one of the jaws is removed.) This conical form *d* is a continuation of the rod A, Fig. 1, which receives a longitudinal motion from the knuckle-joint B by means of the lever C, Fig. 1, so that the cone *d* will expand the jaws *c c c c* to the desired extent to bring the ferrule into exact form, so far as its diameter and parallel sides are concerned.

To bring the ferrule to its exact form in length and to hold the scarfed ends of the wire steady, I use a four-pronged fork with beveled ends, as shown at D, Figs. 1 and 2. This fork I hang upon a fulcrum-rod, as seen at E. This rod E is drawn or pressed backward by a spiral spring, (shown at *e*, Fig. 1,) so as to press the inclined or beveled ends of the prongs of the fork D against the outer coil of the ferrule, and not only hold that coil in its place, but also force the inner coil into the recess in the jaw-holders, (shown at *h*, Fig. 3,) and press all the coils firmly against each other to give the perfect shape.

Having made and arranged the parts of the machine as before described, I raise up the lever C (by the spring F, or otherwise) to the position shown, which will draw back the cone *d*, Fig. 2, to the position shown at *d*, Fig. 1, turn the prongs of the fork away, as shown in Fig. 2, take the ferrule in suitable tongs, (three-pronged is best,) dip it into the melted solder, place it on the jaws, as seen at *g*, Fig. 1, turn the prongs of the fork D upon it, and press down the lever C to force out the cone *d*, as seen in Fig. 2, when the ferrule *g* will be held in its proper shape till the solder is set, when the ferrule may be removed.

Instead of making the jaws *c c c c* small enough to receive the ferrule on the outside, as before described, they may be made large enough to admit the ferrule inside, and the cone or wedge *d* be made to act on the jaws farther back to open them to admit the ferrule, and then by drawing back the cone the jaws, being forced inward by the springs, (or otherwise,) will embrace the ferrule and straighten it, as before described, in which case the prongs of the fork D (or its equivalent) must be beveled or inclined in the opposite direction so as to press the outer coil outward against the concave surface of the jaws to insure the exact shape.

What I claim as my invention, and desire to secure by Letters Patent, is—

The employment of the jaws $c\ c\ c\ c$, with the cone $d$ and fork D, or their equivalent, when the whole is constructed, combined, and made to produce the result in a manner substantially as herein described.

Witnesses:     ASAHEL PIERPONT.
D. M. RUSSELL, Jr.,
R. FITZGERALD.